United States Patent [19]

Khalil

[11] Patent Number: 5,152,944
[45] Date of Patent: Oct. 6, 1992

[54] METHOD OF MAKING AN ELECTRICAL CONNECTOR

[75] Inventor: Hanna Khalil, Cypress, Tex.

[73] Assignee: Halliburton Geophysical Services, Inc.

[21] Appl. No.: 673,621

[22] Filed: Mar. 22, 1991

[51] Int. Cl.⁵ ............................................. B29C 43/18
[52] U.S. Cl. .................................. 264/135; 156/245; 156/308.6; 264/271.1; 439/606
[58] Field of Search ............... 264/135, 271.1, 272.11; 439/604, 606; 264/274, 275, 279; 156/245, 293, 308.6, 324.4

[56] References Cited

U.S. PATENT DOCUMENTS

| | | | |
|---|---|---|---|
| 2,423,842 | 7/1947 | McHenry | 439/606 |
| 2,697,211 | 11/1954 | Voelkner et al. | 439/606 |
| 3,389,749 | 6/1968 | Towns et al. | 156/245 |
| 3,443,845 | 5/1969 | Walchle et al. | 156/245 |
| 3,668,779 | 6/1972 | Turner | 264/275 |
| 4,043,630 | 8/1977 | Suverison et al. | 439/606 |
| 4,348,348 | 9/1982 | Bennett et al. | 264/279 |
| 4,398,785 | 8/1983 | Hedrick | 264/274 |
| 4,704,176 | 11/1987 | Botzman | 264/245 |

OTHER PUBLICATIONS

Brochure, "Chemlock 250, A versatile One-Coat Rubber-to Metal Adhesive", (no date available) distributed by Lord Corp., PA.
Brochure, "Elastollan 1100 Series, Technical Bulletin" distributed by BASF, MI (1988).
Brochure, "Thixon, Technical Bulletin", distributed by Whittaker, OH (no date available).

*Primary Examiner*—Jay H. Woo
*Assistant Examiner*—Robert B. Davis
*Attorney, Agent, or Firm*—David J. Alexander

[57] ABSTRACT

A neoprene plug boot is secured to an electrical connector and to portions of a polyurethane-jacketed conduit adjacent the electrical connector. The method of the present invention includes bonding neoprene to a polyurethane surface by etching the polyurethane surface, coating the etched surface with a bonding agent, applying to the coated surface a neoprene film and contacting the neoprene film with a quantity of neoprene under suitable temperature and pressure.

17 Claims, 1 Drawing Sheet

METHOD OF MAKING AN ELECTRICAL CONNECTOR

FIELD OF THE INVENTION

The present invention relates to electrical connectors and methods for making the same. More particularly, but not by way of limitation, the present invention relates to shielded electrical connectors having a neoprene-based boot bonded to a polyurethane-jacketed electrical conduit.

BACKGROUND OF THE INVENTION

Generally, in the process of acquiring seismic data, recording instruments responsive to ground motion are selectively positioned and coupled to the earth above the subterranean formation of interest. Seismic energy generated and transmitted into the earth imparts motion to the area of the earth proximal to origin of the seismic energy. In some instances, recording instruments responsive to motion generate a signal, generally in the form of voltage, proportional to ground motion.

Collecting and processing these signals requires electrically connecting, via electrical conduits, the recording instruments to seismic processing equipment. From time to time, it is desirable to selectively connect and disconnect the recording instruments from the electrical conduits during seismic data acquisition. In these instances, plug connectors having environmental seals, referred to as "plug boots", secured to robustly insulated electrical conduits are used.

Polyurethane is a common elastomeric material used in manufacturing such plug boots and conduits. Generally, the polyurethane plug boot is formed continuously with a polyurethane-jacketed electrical cable. The extending end of the plug boot is generally provided with a continuous lip for oversealing engagement with a mating plug.

Under mild temperatures, the polyurethane lip provides an adequate environmental seal at the union of the two plugs. However, at extreme temperatures (at about −55° C. and at about 80° C.), the polyurethane boot may stiffen when exposed to frigid temperatures, or become overly pliable when exposed to warmer temperatures. Additionally, the coefficient of compression of polyurethane is such that after repetitive engagements, the polyurethane lip may cease to adequately overseal with the mating plug. "Memory loss" is a term commonly used to describe the failure of the polyurethane lip to provide such overseal after repetitive engagements.

Another elastomeric material used in the manufacture of plug boots and conduits is neoprene. Generally, neoprene boots provide an adequate environmental seal over a wider temperature range than thermoplastics, including polyurethane, and also exhibit superior "memory" after repetitive engagements. However, neoprene jacketed cables have been found to be less robust than polyurethane-jacketed cables. Thus there exist the need for an electrical conduit and a reliable method of making the same that combines the superior sealing ability of neoprene and the superior robust qualities polyurethane.

SUMMARY OF THE INVENTION

The present invention provides a urethane-jacketed electrical conduit having a neoprene plug boot sealingly secured to an electrical connector and to portions of the urethane-jacketed electrical conduit. The electrical connector is secured to an end of the urethane-jacketed electrical conduit and the plug boot overlies the electrical connector and portions of the urethane-jacketed conduit adjacent the electrical connector. The method of the present invention includes bonding neoprene to urethane by etching the urethane surface, coating the etched surface with a bonding agent, applying to the coated surface a neoprene film and contacting the neoprene film with a quantity of neoprene under suitable temperature and pressure.

DESCRIPTION OF THE PREFERRED EMBODIMENTS

Figure 1:
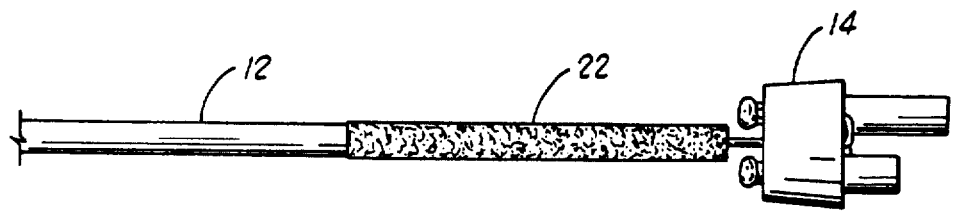
FIG. 1 is a plan view of an electrical conduit and an electrical plug connected at an end thereof. Etched portions of the conduit adjacent electrical plug are also illustrated.
Figure 2:
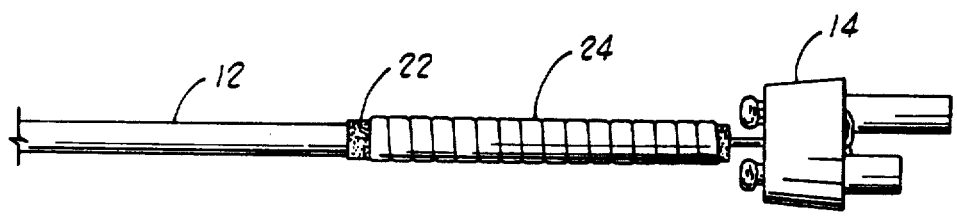
FIG. 2 is similar to the view of FIG. 1 further illustrating a neoprene film applied to a portion of the etched surface of the electrical conduit.
Figure 3:
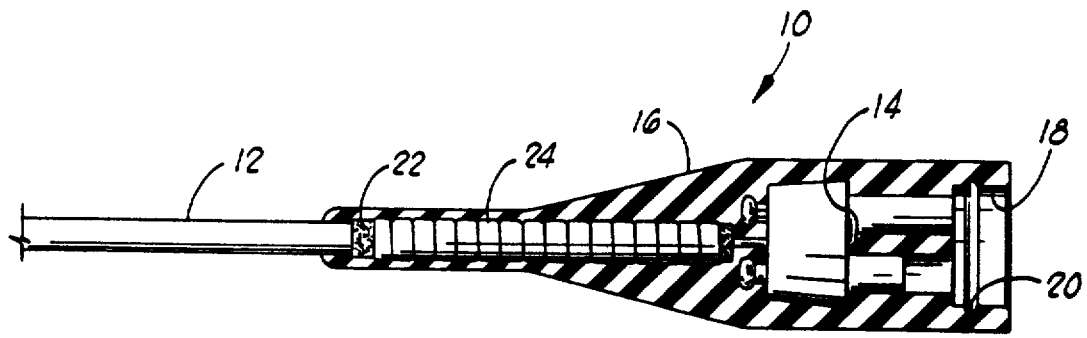
FIG. 3 is a cross-sectional view of the present invention.

Referring to FIGS. 1-3, and with particular attention to FIG. 3, the apparatus of the present invention includes an electrical connector generally designated by the reference numeral 10. The electrical connector 10 includes a jacketed electrical conduit 12 and an electrical plug 14 connected to a end of the electrical conduit 12 in a conventional manner. A boot 16 is secured, such as by bonding, to the electrical plug 14 and to portions of the jacketed electrical conduit 12 adjacent the electrical plug 14. The boot 16 is preferably formed and secured to the conduit 12 by injection molding as discussed in greater detail below.

The boot 16 includes a continuous lip 18 for oversealing engagement with a mating plug (not shown). Portions of the continuous lip 18 define a continuous grove 20 for detenting engagement with structure of a mating plug or adapter (not shown).

The jacket of the jacketed electrical conduit 12 is preferably constructed of an elastomeric based material and more preferably of a thermoplastic based material and still more preferably of a urethane based material and most preferably of a polyurethane based material. The jacket material of the jacketed electrical conduit 12 preferably includes a heat stabilizing additive. One such suitable jacketed electrical conduit 12 constructed of polyurethane and containing a heat stabilizing additive is BASF 1185A, a product of BASF Corporation, Mich. The boot 16 is preferably constructed of a neoprene based material and more preferably of uncured neoprene.

Referring now to FIG. 1 in accordance with the present invention, the method of bonding a neoprene body to a polyurethane surface, and more particularly, the method of bonding a neoprene body to a polyurethane-jacketed electrical conduit and an electrical plug connected to the polyurethane-jacketed cable is preformed by securing the electrical plug 14 to an end of the jacketed electrical conduit 12. The electrical connections between the conduit 12 and the plug 14 are made in the conventional manner.

The a length of the jacketed surface of conduit 12 adjacent the plug 14 is etched and clean. The polyurethane surface may be etched either chemically or mechanically but preferably by mechanical sanding. The etched surface 22 and plug 14 may be cleaned by swabbing with a cleaning solution, and more preferably with a solution of tetrahydroflurine (THF). A portion of the conduit 10, including the plug 14 and a short length, preferably 0.125 inches, of the etched surface immediately adjacent the plug 14, are coated with a first bonding agent (not shown), preferably a non-conductive bonding agent. The first bonding agent is preferably a vulcanizing metal primer. A suitable first bonding agent is THIXON P-6-1, a product of Whittaker Co., Ohio. After allowing the applied first bonding agent sufficient time to dry, preferably 4 to 6 hours, the non-coated etched surface 14 may be swabbed with a THF solution.

The non-coated etched surface 14 is coated with a second bonding agent (not shown). The second bonding agent may be conductive or non-conductive. One such suitable conductive bonding agent is CHEMLOK 250, a product of Lord Corporation, Pa. If THIXON P-6-1 is used as the first bonding agent and CHEMLOK 250 is used as the second bonding agent, the second bonding agent should not contact or be applied to the first bonding agent. Drying time for the second bonding agent is preferably 3 to 8 hours.

Referring now to FIG. 2, a neoprene based film 24, is applied to an area of the coated surfaces of the jacketed conduit 12. The composition of the film 24 is preferably uncured neoprene. The film 24 may be applied by several methods, such a spraying, painting, dipping or preferably wrapping about the coated polyurethane surface. The thickness of the film 24 is generally between 0.020 inches and 0.200 inches and preferably between 0.020 inches and 0.060 inches.

After applying the film 24 to the jacketed conduit 12, the conduit 12 is positioned in a suitable molding apparatus (not shown), such as a CLIFTON 30T, a product of Clifton Fluid Power Machinery Inc., N.J., such that a neoprene based material, preferably uncured neoprene, introduced into said molding apparatus contacts and overlies the plug 14 and the film 24. Prior to introducing the neoprene material into the molding apparatus, the surfaces of the molding apparatus contacted by the neoprene material may be coated with a sufficient quantity of a non-stick silicone solution, such as for example, CAMIE 888, a release agent and lubricant, a product of Camie-Campbell Inc., St. Louis, Mo. Preferably, the molding temperatures may range from between about 245° F. to 265° F. and molding pressure may be approximately 65 psi. Curing time in the molding apparatus is approximately 25 minutes.

After removing the electrical connector 10 from the molding apparatus, the connector is preferably cured for an additional 12 hours at 195° F.

Additional advantages and modifications will be readily apparent to those skilled in the art. The invention in its broader aspects is therefore not limited to the specific details or the illustrative examples shown and described. Accordingly, changes may be made in the construction, operation, and arrangement of the various parts, elements, steps and procedures described herein without departing from the spirit and scope of the invention as defined in the following claims.

What is claimed is:
1. A method of bonding a neoprene body to a urethane surface comprising:
   (a) etching the urethane surface;
   (b) coating the etched surface with a bonding agent;
   (c) applying a neoprene film to the coated surface; and
   (d) contacting the neoprene film with a quantity of neoprene under suitable temperature and pressure.
2. The method of claim 1 wherein the urethane surface is mechanically etched.
3. The method of claim 1 wherein the neoprene film is between 0.020 and 0.200 inches thick.
4. The method of claim 1 wherein step (d) further comprises placing the product of step (c) in a mold and introducing a quantity of neoprene into the mold.
5. The method of claim 1 wherein the neoprene film is between 0.020 and 0.060 inches thick.
6. The method of claim 1 wherein the urethane surface includes a heat stabilizing additive.
7. A method of bonding a neoprene boot to a urethane jacketed cable comprising:
   (a) etching the surface urethane cable;
   (b) coating the etched surface with a bonding agent;
   (c) applying a neoprene film to the coated surface; and
   (d) contacting the neoprene film with a quantity of neoprene under suitable temperature and pressure.
8. The method of claim 7 wherein the urethane surface is mechanically etched.
9. The method of claim 7 wherein the neoprene film is between 0.020 and 0.200 inches thick.
10. The method of claim 7 wherein the neoprene film is between 0.020 and 0.060 inches thick.
11. The method of claim 7 wherein step (d) further comprises placing the product of step (c) in a mold and introducing a quantity of neoprene into the mold.
12. The method of claim 7 wherein the urethane-jacketed cable includes a heat stabilizing additive.
13. A method of bonding a neoprene body to a urethane-jacketed cable and an electrical plug connected to the urethane-jacketed cable comprising:
   (a) etching the surface of a length of the urethane cable adjacent the electrical plug;
   (b) coating the electrical plug with a first bonding agent;
   (c) coating a portion of the etched urethane cable surface with a second bonding agent;
   (d) applying a neoprene film to the coated etched surface; and
   (e) contacting the coated electrical plug and neoprene film with a quantity of neoprene under suitable temperature and pressure.
14. The method of claim 13 wherein the urethane surface is mechanically etched.
15. The method of claim 13 wherein the neoprene film is between 0.020 and 0.200 inches thick.
16. The method of claim 13 wherein the neoprene film is between 0.020 and 0.060 inches thick.
17. The method of claim 13 wherein step (e) further comprises placing the product of step (d) in a mold and introducing a quantity of neoprene into the mold.

* * * * *